(No Model.) 2 Sheets—Sheet 1.
A. OSENBRÜCK.
REFRIGERATING MACHINE.
No. 311,028. Patented Jan. 20, 1885.
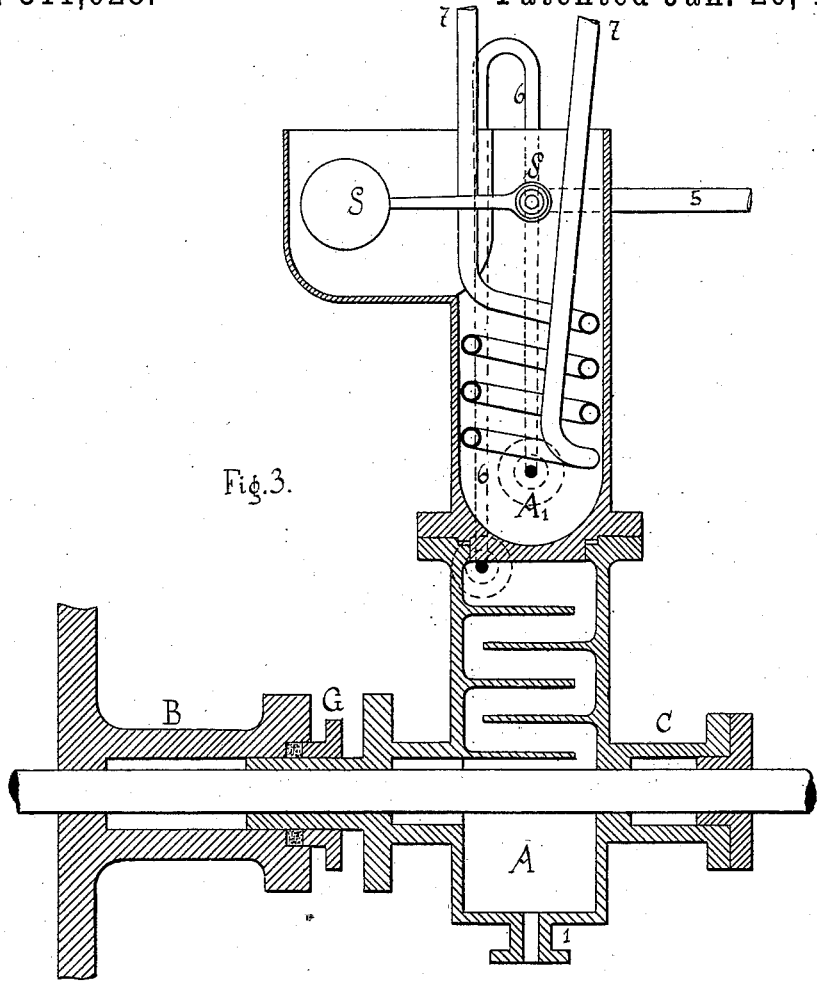
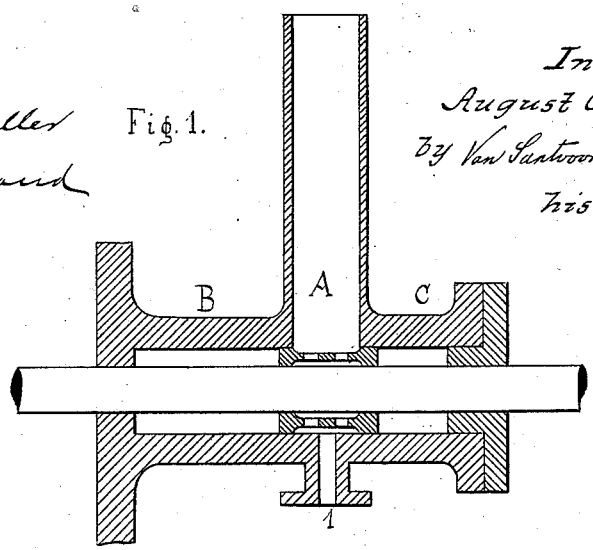
Witnesses
William Miller
Otto Hufeland
Inventor
August Osenbrück
By Van Santvoord & Hauff
his att'ys

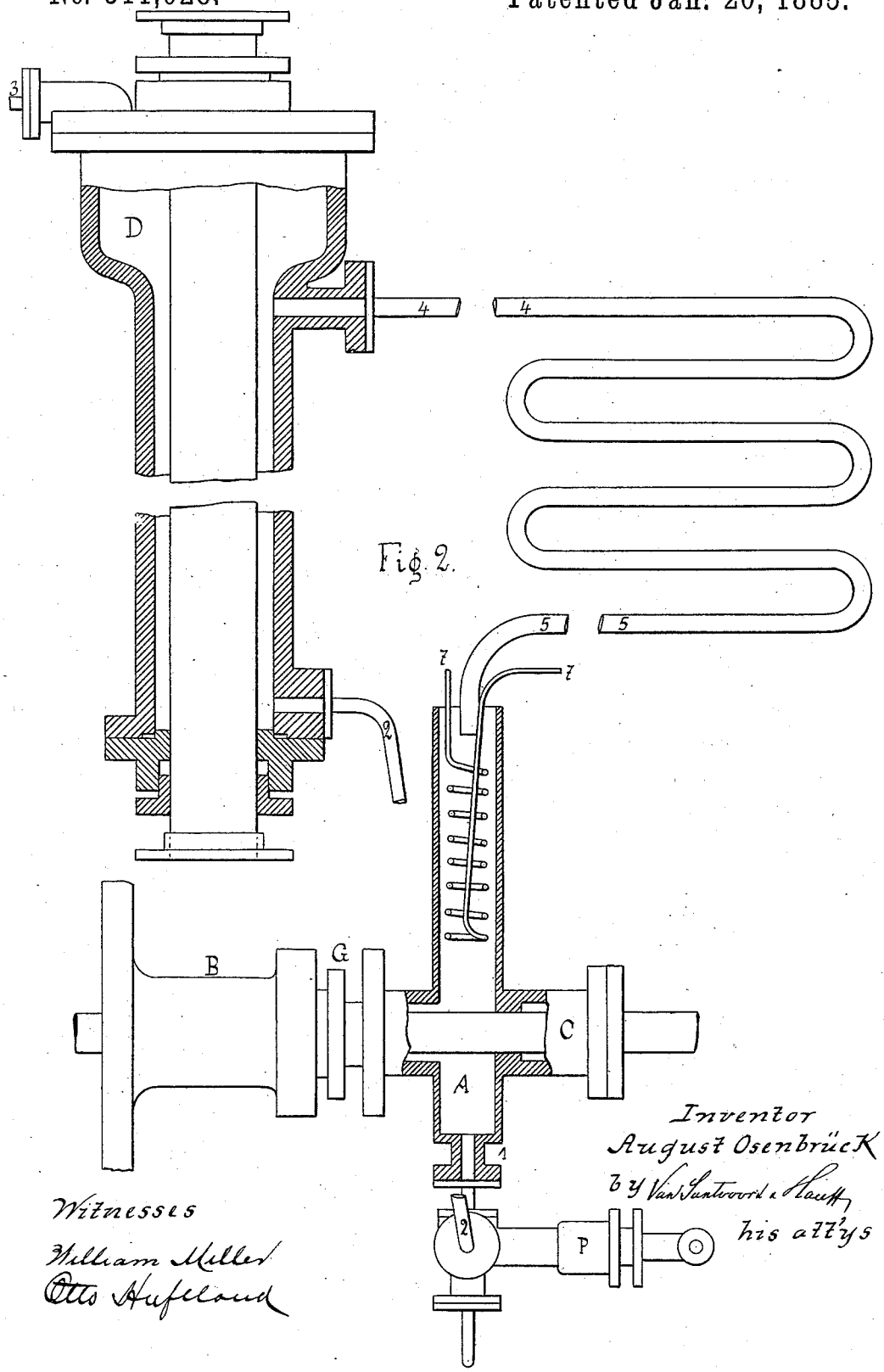

UNITED STATES PATENT OFFICE.

AUGUST OSENBRÜCK, OF HEMELINGEN, PRUSSIA, GERMANY.

REFRIGERATING-MACHINE.

SPECIFICATION forming part of Letters Patent No. 311,028, dated January 20, 1885.

Application filed April 24, 1884. (No model.)

*To all whom it may concern:*

Be it known that I, AUGUST OSENBRÜCK, a subject of the King of Prussia, residing at Hemelingen, in the Kingdom of Prussia and German Empire, have invented new and useful Improvements in Air-Compressors for Refrigerating-Machines, of which the following is a specification.

In such structures as, for example, compression-pumps, which work with volatile bodies, and which are frequently employed for generating ice and cold, a great difficulty lies in obtaining a good tightening of the stuffing-boxes to insure against loss of the volatile body, (ammonia, methylene-ether, and the like,) which may frequently be very costly. The means heretofore employed for this purpose was the arrangement of a so-called "obstructing-fluid," which, resting under a certain pressure, bears either a simply chemical or a chemical and mechanical neutral relationship to the volatile body employed, and so is intended to prevent loss either in whole or in part. (By the obstructing-fluid being mechanically neutral in relation to the volatile body is to be understood that the same shows no absorbing capacity for this body.) Such an obstructing-fluid, however, which acts mechanically neutral against the volatile body is only to be produced under certain conditions.

The object of this invention is to prevent said losses by means of a lubricating-fluid, and also to make use of the generally present absorbing property of the fluid bearing a chemically neutral relationship to the volatile body, since thereby all loss is excluded while the fluid may be kept under ordinary atmospheric pressure. For this purpose there is arranged at the stuffing-box a receiver containing the chemically neutral lubricating-fluid, which receiver is open and consequently resting under ordinary atmospheric pressure. In this receiver the volatile body escaping through the stuffing-box will be absorbed by the lubricating-fluid, which acts chemically neutral as regards the volatile body, and which fluid is contained in such receiver, so that a loss by escape of the volatile body into the outer atmosphere does not occur, and a recovering of the volatile body from the fluid which has absorbed the same may be had. The absorbing-fluid employed should be of such a nature that it possesses the greatest absorbing capacity. As it is known that a fluid or gas under constant pressure absorbs the more the lower its temperature, there is in general chosen such a fluid which, besides great lubricating-power, also possesses the quality to congeal only at a very low temperature. As especially adapted for this purpose has shown itself the oleo-naphtha from Nizhnee-Novgorod, which possesses a cold-test of 23° centigrade. This fluid is kept by known means at a suitable minus temperature, so that the same absorbs all gases escaping through the insecurity of the packing of the piston-rod. This fluid, before the same has reached its full degree of impregnation, is removed from the receiver and replaced by other fluid, while the volatile body is separated by distillation from such removed fluid, and again led to the machine. This arrangement has also the advantage that a loss of the volatile body by its being carried out by adherence to the piston-rod cannot occur, as this carrying off by adherence is only possible in case of an obstructing-fluid exposed to a higher than atmospheric pressure and by consequent absorption strongly impregnated with the volatile body, which, according to the explanations above given, is not the case with the absorbing and lubricating fluid here employed.

In the drawings are represented side elevations of devices which may be employed to carry out the said process.

Figure 1 represents the simplest of the devices shown. The other figures show modifications.

Similar letters indicate corresponding parts.

The letter A represents the absorption-receiver; B, the stuffing-box. The open absorption-receiver A contains the suitable absorbing and lubricating fluid to a suitable height. This receiver is secured against loss of oil to the exterior by a packing or cap, C. The lubricant surrounds the piston-rod and keeps the packing in the degree of fatness requisite for tightness. Through the plug 1 the lubricating-fluid may be drawn off either continuously, in which case in an equally continuous manner fresh lubricating-fluid must be fed into the absorption-receiver, or the removal of the fluid impregnated with gas may take place intermittently. In this arrangement it has been assumed that the lubricating-fluid is of a temperature below that of the surrounding atmosphere, and that a further cooling of the same is not undertaken.

In Figs. 2 and 3 are shown arrangements by which as well a further cooling of the obstructing-fluid as also a continuous circulation of the whole process is sought to be attained, so that as well the drawing off of the fluid impregnated with the volatile bodies as also the freeing of the same from the volatile body and return of both the lubricating-fluid and volatile body into the operation of the machine take place automatically.

In the arrangement shown in Fig. 2, A is the absorption-receiver; B, the stuffing-box. The case of the stuffing-box, in so far as it is not of one piece with the absorption-vessel A, (as is the case in the construction of Fig. 1,) is protected by the surrounding stuffing-box G against an escape of the volatile body.

C is the stuffing-box for the outer securing of the absorption-receiver. Through the plug 1 a pump, P, the stroke of which may be varied, draws off corresponding quantities of the absorbing and lubricating fluid more or less impregnated with gas. A corresponding quantity of cooled fluid is led into the absorption-chamber A through the tube 5. This fluid may be brought to a lower temperature by a cooling-worm, 7, arranged in the absorption-chamber, in which worm 7 occurs an evaporation of the fluid, serving in the machine as a generator of cold.

The pump P forces the liquid through the tube 2 into the distilling apparatus D, where the same can be indirectly heated either by boiler vapor or by the steam passing off from the machine. The tube 3 can connect the distilling apparatus with the suction-conduit of the compressor, so that the outflowing gas is drawn off and led to the machine, while the heated fluid, free from gas, can pass through the tube 4 into a cooling-worm tube, which is in contact with the freezing-fluid of the generator, or otherwise cooled, and having been brought to the requisite low temperature can pass again into the absorption-receiver A. A preliminary cooling by cold water may precede the cooling by a freezing-mixture.

In Fig. 3 is shown a somewhat modified construction from that just described. The absorption-receiver is divided into two compartments, A and A'. The lower compartment, A, contains partitions which compel the fluid to take a zigzag course in its descent. The object of this arrangement is to insure absorption by keeping the gas for a longer time in contact with the fluid, which otherwise is only to be accomplished by a high column of fluid. The vessel A', which is open above, is applied or screwed to the lower one and closes it. Through the tube 6 both compartments communicate, so that also the lower closed compartment rests under free atmospheric pressure irrespective of the weight of the oil-column. The upper compartment, A', is kept supplied with a constant level of fluid by a float-valve, S, and the fluid takes its way from the bottom of said compartment through the tube 6 into the lower compartment. By the evaporating-tube 7, by means of the disposable generator of cold in the machine, the absorption-fluid may be brought to a lower temperature than the generator temperature.

The operation is in the arrangement just described just like the operation described in connection with Fig. 2. The arrangement of Fig. 3 has an advantage of greater security that all escaping gas is absorbed by the fluid, and the same operates by means of the float-valve, which automatically regulates the inflow into the receiver A' of the fluid, free from gas, without interference on the part of the attendant. A regular circulation of the absorbing and lubricating fluid takes place.

In the construction shown in the drawings the pump P acts independently of the machine—that is to say, while the machine is at work or engaged in refrigerating or generating cold the pump P may be at rest, or the pump P may operate while the machine is at rest, or both the machine and the pump may simultaneously operate or remain at rest. The pump P can thus be utilized whenever it is necessary, and may remain at rest if not required to operate. An advantage hereby gained is that the lubricant need not be drawn off from the stuffing-box before it is fully saturated with the volatile body.

The distilling apparatus D, as here seen, has a channel for the steam or heat passing through its interior, so as to have the contents of the distilling apparatus raised to a sufficiently high temperature to rapidly effect the separation or distillation desired.

What I claim as new, and desire to secure by Letters Patent, is—

1. The method of preventing the loss of gas or volatile bodies passing or escaping from stuffing-boxes by causing such air or volatile bodies to be absorbed by an absorbent exposed to the ordinary atmospheric pressure, renewing said gas or volatile bodies from such absorbent by distillation, and returning said absorbent to the stuffing-box to be again used, substantially as described.

2. The combination, with a stuffing-box, of a reservoir or receiver, A, connecting with said stuffing-box, and the interior of which reservoir is exposed to the ordinary atmospheric pressure, and a distilling apparatus, D, communicating directly with the outlet 1 of the reservoir A, substantially as described.

3. The combination, with a stuffing-box, of a reservoir or receiver, A, the interior of which is exposed to the ordinary atmospheric pressure, and a pump, P, operating independently of the operation of the remainder of the apparatus, substantially as described.

4. The combination, with a stuffing-box and a receiver, A, the interior of which is exposed to the ordinary atmospheric pressure, of a pump, P, operating independently of the operation of the remainder of the apparatus, distilling apparatus D, and a cooling apparatus, 4, substantially as described.

5. The combination, with a stuffing-box and a receiver, A, the interior of which is exposed to the ordinary atmospheric pressure, of a pump, P, operating independently of the operation of the remainder of the apparatus, distilling apparatus D, provided with an internal heating-channel, and a cooling apparatus, 4, substantially as described.

6. The combination, with a stuffing-box, of a primary receiver, A', provided with a float-valve, S, and a secondary receiver, A, provided with partitions, the interiors of both the primary and secondary receivers being exposed to the ordinary atmospheric pressure, substantially as described.

In testimony whereof I have signed my name to this specification in the presence of two subscribing witnesses.

AUGUST OSENBRÜCK.

Witnesses:
FR. NEUKIRCH,
HEINR. BEHRENS.